(12) United States Patent  
Ubillos (10) Patent No.: US 8,276,074 B2  
(45) Date of Patent: Sep. 25, 2012

(54) USER INTERFACES FOR EDITING VIDEO CLIPS

(75) Inventor: Randy Ubillos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1135 days.

(21) Appl. No.: 12/121,645

(22) Filed: May 15, 2008

(65) Prior Publication Data

US 2009/0288010 A1 Nov. 19, 2009

(51) Int. Cl.
 *G06F 3/00* (2006.01)
(52) U.S. Cl. .................. 715/720; 715/719; 715/723
(58) Field of Classification Search ............... 715/716, 715/719, 720, 721, 722, 723, 724, 725, 726; 386/280, 282

See application file for complete search history.

(56) References Cited

U.S. PATENT DOCUMENTS

| | | | | |
|---|---|---|---|---|
| 5,999,173 | A * | 12/1999 | Ubillos | 715/724 |
| 6,621,503 | B1 * | 9/2003 | Ubillos | 715/723 |
| 7,546,532 | B1 * | 6/2009 | Nichols et al. | 715/716 |
| 2003/0002851 | A1 | 1/2003 | Hsiao et al. | |
| 2005/0216840 | A1 * | 9/2005 | Salvucci | 715/723 |
| 2006/0090141 | A1 * | 4/2006 | Loui et al. | 715/764 |
| 2007/0022080 | A1 * | 1/2007 | Broeksteeg | 707/1 |
| 2007/0162853 | A1 * | 7/2007 | Weber et al. | 715/719 |
| 2008/0152298 | A1 | 6/2008 | Ubillos | |
| 2008/0155421 | A1 | 6/2008 | Ubillos et al. | |
| 2010/0262912 | A1 * | 10/2010 | Cha | 715/719 |

FOREIGN PATENT DOCUMENTS

| | | |
|---|---|---|
| EP | 0526064 | 2/1993 |
| JP | 11146336 | 5/1999 |
| JP | 2003052001 | 2/2003 |
| WO | WO2006064358 | 6/2006 |

OTHER PUBLICATIONS

"iMovie at a Glance" toutorial, "iMovie.pdf" Apple, 2004, 49 pages.*
Turner R. R., "1001 Questions to Ask Before Deciding on a Nonlinear Video Editing System", SMPTE Journal, Scarsdale, NY, US, vol. 103, No. 3, Mar. 1, 1994, pp. 160-173, XP00044583.
International Search Report and the Written Opinion of the International Searching Authority for Application No. PCT/US2009/040524, dated Dec. 17, 2009.
Japanese Application No. 2011-509521, Office Action mailed Jan. 12, 2012, 2 pages.

* cited by examiner

*Primary Examiner* — Haoshian Shih
(74) *Attorney, Agent, or Firm* — Fish & Richardson P.C.

(57) ABSTRACT

A computer-implemented method including displaying in a user interface, a first thumbnail representing a first video clip including a first plurality of frames; displaying in the first thumbnail, a first transition point positioned between a left edge and a right edge of the first thumbnail, the first transition point associated with a frame of the first plurality of frames, wherein, playback of the first plurality of frames starts with a first start frame positioned at the left edge and stops at the frame associated with the first transition point; receiving a first move input to move the frame associated with the first transition point to a new frame of the first plurality of frames; and in response to receiving the input, associating the new frame with the first transition point, wherein, in response to a playback input, playback starts with the first start frame and stops at the new frame.

69 Claims, 5 Drawing Sheets

USER INTERFACES FOR EDITING VIDEO CLIPS

TECHNICAL FIELD

In general, this disclosure relates to editing video clips.

BACKGROUND

Scenes in motion can be captured and recorded using a variety of devices ranging from state-of-the-art professional video cameras used in television and movie-making to simple cameras on cellular telephones. Some of the devices that can be used to capture motion pictures, including digital camcorders and digital cameras, also allow storing the captured images in digital format including the Moving Picture Experts Group (MPEG) format. Depending on device capabilities and user settings, a camera can capture and store both audio and video. The recorded information is automatically stored in digital format and can be easily transported to secondary devices including hard disks in computers using various wired or wireless communications protocols such as bluetooth or universal serial bus (USB) based devices.

Video editing software, such as iMovie® HD 6.0.1, provided by Apple, Inc. (Cupertino, Calif.), provides users with non-linear editing techniques to edit raw footage. Such editing can include cutting segments of the footage, re-arranging segments of the same video clip, re-arranging and combining segments of multiple video clips, or adding content such as audio tracks, voice-overs, titles, and transitions between frames.

SUMMARY

This specification describes technologies relating to user interfaces for editing video clips.

This disclosure relates to video clip editing in a visual manner. In one example, one or more rectangular thumbnails are displayed in a row in a user interface. Each thumbnail represents a video clip that includes multiple frames. Collectively, the video clips represent a video editing project. In response to input, the video clip is played back starting from a frame positioned on a left edge of the left-most thumbnail until a frame that corresponds to a transition point. The transition point can be selectively positioned between the left edge and a right edge of the thumbnail. The transition point is associated with a frame positioned on the right edge of the right-most thumbnail unless a new frame of the thumbnail is selected. Selecting the new frame causes the new frame to be associated with the transition point and therefore, playback of the video clip ends at the new frame.

In one aspect a computer-implemented method includes displaying a first video segment in a first bounded region and a second video segment in a second bounded region. A first indicia is displayed in the first bounded region. The first indicia is movable to any point in the first bounded region. The first indicia represents a first transition point that corresponds to a first time instant in the first video segment such that a portion from the beginning of the first video segment to the first time instant is playable. A second indicia is displayed in the second bounded region. The second indicia is movable to any point in the second bounded region. The second indicia represents a second transition point that corresponds to a second time instant in the second video segment such that a portion from the second time instant to an end of the second video segment is playable. A playback input is received and in response to receiving the playback input, the portion from the beginning of the first video segment to the first time instant and the portion from the second time instant to the end of the second video segment is played back continuously.

This and other aspects can include one or more of the following features. Selection of a different time instant in the first video segment can be detected. In response to the detecting, the first indicia can be displayed at the different time instant. The portion from the beginning of the first video segment to the different time instant can be playable. A new playback input can be received. In response to receiving the new playback input, the portion from the beginning of the first video segment to the different time instant and the portion from the second time instant to the end of the second video segment can be played back continuously.

In one aspect a computer-implemented method includes displaying, in a user interface, a first thumbnail representing a first video clip. The first video clip includes a first multiple of frames. The first thumbnail includes a left edge and a right edge. The first multiple of frames are distributed between the left edge and the right edge of the first thumbnail. The first multiple of frames are playable starting with a first start frame positioned at the left edge of the first thumbnail and ending with a first end frame positioned at the right edge of the first thumbnail. A first transition point positioned between the left edge and the right edge of the first thumbnail is displayed in the first thumbnail. The first transition point is associated with a frame of the first multiple of frames. In response to a playback input, playback of the first multiple of frames starts with the first start frame positioned at the left edge aid stops at the frame associated with the first transition point. A first move input is received to move the frame associated with the first transition point to a new frame of the first multiple of frames. In response to receiving the first move input, the new frame is associated with the first transition point. In response to the playback input, playback of the first multiple of frames starts with the first start frame positioned at the left edge of the first thumbnail and stops at the new frame.

This and other aspects can include one or more of the following features. The first thumbnail can be displayed in a row. A second thumbnail representing a second video clip in another row vertically displaced from the row can be displayed in the user interface. The second video clip includes a second multiple of frames. The second thumbnail includes a left edge and a right edge. The second multiple of frames are distributed between the left edge and the right edge of the second thumbnail. The second multiple of frames are playable starting with a second start frame positioned at the left edge of the second thumbnail and ending with a second end frame positioned at the right edge of the second thumbnail. A second transition point positioned between the left edge and the right edge of the second thumbnail is displayed in the second thumbnail. The second transition point is associated with a frame of the second multiple of frames. In response to the playback input, playback of the second multiple of frames starts at the frame associated with the second transition point and stops at the second end frame positioned at the right edge of the second thumbnail. A second move input is received to move the frame associated with the second transition point to a new frame of the second multiple of frames. In response to receiving the second move input, the new frame is associated with the second transition point. In response to the playback input, playback of the second multiple of frames starts with the new frame and stops at the second end frame positioned at the right edge of the second thumbnail. The first transition point can be aligned with the second transition point in the user interface. Aligning the first transition point with the second transition point can include positioning the frame associated with the second transition point below the first transition point. The first transition point and the second transition point can be represented by a vertical bar in the user interface. The vertical bar can pass through the first thumbnail and the second thumbnail. Upon detecting positioning of a cursor on the first thumbnail or in the row, the first multiple of frames can be played back. Upon detecting positioning of the cursor on the second thumbnail or in the another row, the second multiple of frames can be played back. In response to receiving the playback input, the frames from the first start frame positioned at the left edge of the first thumbnail to the frame associated with the first transition point and then from the frame associated with the second transition point to the second end frame positioned at the right edge of the second thumbnail can be continuously played back. The first video clip and the second video clip can be selectively contiguous. A third video clip can include the first multiple of frames distributed between the left edge and the first transition point of the first thumbnail and the second plurality of frames distributed between the second transition point and the right edge of the second thumbnail. Upon detecting positioning of the cursor outside the row and the another row, the third video clip can be played back. The third video clip can be saved. Upon detecting positioning of the cursor with the row, a preceding thumbnail representing a preceding video clip to the left of the left edge of the first thumbnail and a subsequent thumbnail representing a subsequent video clip to the right of the right edge of the first thumbnail can be displayed. The new frame can be selected and dragged to the left of the user interface. In response to dragging the new frame to the left of the user interface, additional thumbnails representing additional video clips subsequent to the subsequent video clip can be displayed. Upon receiving the first move input to move the frame associated with the first transition point to the new frame, the first thumbnail can shift relative to the vertical bar. The first multiple of frames starting with the first start frame positioned at the left edge of the first thumbnail and ending at the frame associated with the first transition point can be emphasized. The second multiple of frames starting at the frame associated with the second transition point and ending with the second end frame positioned at the light edge of the second thumbnail can be emphasized. The first thumbnail can be rectangular.

In one aspect a computer-implemented method includes displaying in a user interface display region a multiple of bounded regions each displaying respective video segments. Included in the user interface display region is at least a first bounded region displaying a first video segment and a second bounded region displaying a second video segment. A transition marker that intersects the first and second bounded regions is displayed in the user interface display region. The transition marker defines a first transition point in the first video segment and a second transition point in the second video segment. The first transition point corresponding to a first intersection of the transition marker and the first bounded region. The second transition point corresponding to a second intersection of the transition marker and the second bounded region. User input is received to alter one or both of the first and second transition points by visually effecting relative movement between one or more of the first video segment, the second video segment and the transition marker.

This and other aspects can include one or more of the following features. An edited video segment including a portion of the first video segment ending at the first transition point followed by a portion of the second video segment beginning at the second transition point can be displayed. Particular implementations of the subject matter described in this specification can be implemented to realize one or more of the following potential advantages. For example, displaying multiple video clips represented by thumbnails in the same user interface enables simultaneous editing of the multiple video clips. In addition, displaying multiple video clips in the same user interface enables a user to skim other video clips of the video editing project. Moreover, displaying an adjustable transition point enables the user to transition from one video clip to the next at any frame in the video clip. Additionally, the user interface can be implemented to enable blending of multiple video clips. Furthermore, multiple video clips, as well as the blended video clip, can be displayed in the same user interface. The video editing software application also enables saving the blended video clip as a separate project without affecting the video clips included in the blended video clip. In addition, displaying trimming functions enables the user to generate shorter video clips by trimming video clips. Moreover, the video editing software application enables saving the shorter video clips as separate projects without affecting the original video clips. The user interface can be implemented to display a simplistic format for editing video clips. Additionally, the user interface enables a user lacking knowledge of advanced editing techniques to generate the video editing project. Furthermore, video clip editing experiences are enhanced.

Details of one or more implementations are set forth in the accompanying drawings and the description below. Other aspects can be implemented in systems and computer program products, encoded on a computer-readable medium, operable to cause data processing apparatus to perform such operations. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
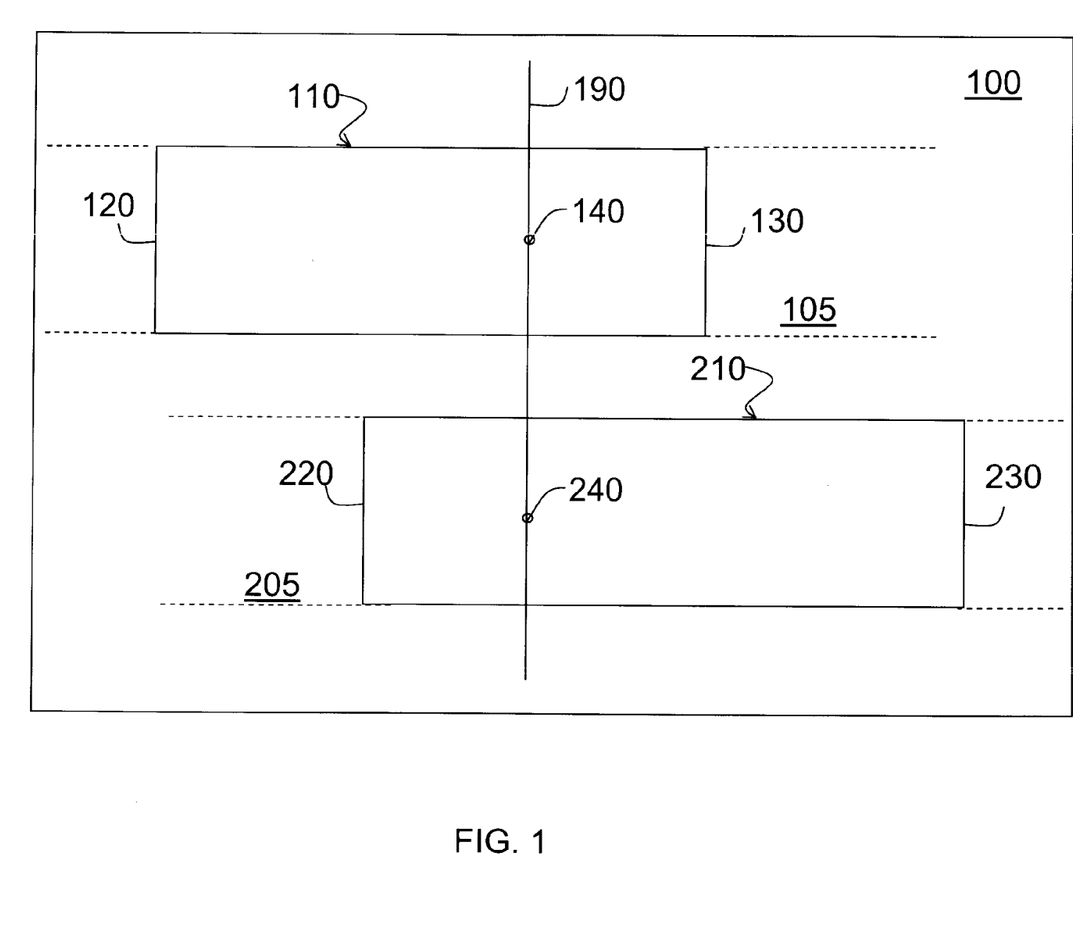
FIGS. 1-3 show an exemplary user interface for editing video clips.

FIG. 1 shows an exemplary user interface 100 for editing video clips. The user interface 100 is provided by a video editing software application installed, e.g., on a computer system, where a user can view, edit, or otherwise process video clips by uploading the video clips in the user interface 100. The video clips can be entire video files or portions of video files saved in a storage device operatively coupled to the computer system on which the video editing software application is installed. In some implementations, a user may import video clips represented by thumbnails, or bounded regions, into user interface 100. A first thumbnail 110 represents a first video clip including a first plurality of frames. The first plurality of frames is distributed within the first thumbnail 110 between a left edge of the first thumbnail 120 and a right edge of the first thumbnail 130. In response to user input, starting with a first start frame positioned at the left edge 120 of the first thumbnail 110, the first plurality of frames can be played back in the user interface 100 until playback ends at a first end frame positioned at the right edge 130 of the first thumbnail 110. The first plurality of frames are displayed in a row 105.

The first thumbnail 110 has a first transition point 140. The first transition point 140 can be selectively positioned between the left edge 120 and the right edge 130 of the first thumbnail 110. The first transition point 140, in default implementations, is associated with the first end frame positioned at the right edge 130 of the first thumbnail 110. Playback of the first plurality of frames ends at the frame associated with the first transition point 140. Frames, of the first plurality of frames, located to the right of the first transition point 140 are not played back. The user may change the frame associated with the first transition point 140 by selecting a new frame in the first thumbnail 110. Although denoted as a point in FIG. 1, the first transition point 140 can be implemented as a circle, a line, a plane, a panel or other reasonable indicia, or can be implemented having no indicia.

The first transition point 140 provides a user with a visual method of editing video clips. The video editing software application enables the user to designate a frame in row 105 to be associated with the first transition point. In some implementations, the first transition point 140 can be associated with a frame of the first thumbnail 110 thereby enabling playback of the first video clip from the first start frame positioned at the left edge 120 of the first thumbnail 110 to the frame associated with the first transition point 140. In other implementations, the first transition point 140 can be associated with the first end frame positioned at the right edge 130 of the first thumbnail 110, thus enabling playback of the entire first video clip in the user interface 100. Alternatively, the first transition point 140 can be associated with the first start frame positioned at the left edge 120 of the first thumbnail 110, thus preventing playback of the first video clip and effectively eliminating the first thumbnail 110 from the video editing project. By associating the first transition point 140 with a frame of the first thumbnail 110, the first transition point 140 can be used for fine tune editing of the first video clip.

In some implementations, to associate the first transition point 140 with a frame of the first thumbnail 110, the user can select and drag the first transition point 140 to the desired frame of the first thumbnail 110. For example, in response to the user selecting the first transition point 140, the video editing software application enables dragging the first transition point 140 along the first plurality of frames in row 105 to associate with a frame of the first thumbnail 110. In some implementations, the user can select, e.g., click, a frame of the first thumbnail 110 in order to associate the first transition point 140 with the frame. For example, in response to the user clicking the frame of the first thumbnail 110, the video editing software application will associate the first transition point 140 with the frame clicked upon.

In addition to the first thumbnail 110, the video editing software application can display thumbnails preceding the first thumbnail 110 and thumbnails subsequent the first thumbnail 110 in row 105. Thumbnails representing video clips displayed before (i.e., to the left of the left edge 120) the first thumbnail 110 in row 105 are preceding thumbnails. Conversely, thumbnails representing video clips displayed after (i.e., to the right of the right edge 130) the first thumbnail 110 in row 105 are subsequent thumbnails. In some implementations, the user can drag the first transition point 140 beyond the left or right edges 120, 130 of the first thumbnail 110 within row 105 so that the first transition point 140 can be associated with frames of a preceding thumbnail or frames of a subsequent thumbnail, respectively. For example, in response to the user dragging the first transition point 140 beyond the left edge 120 of the first thumbnail 110, the video editing software application enables the user to associate the first transition point 140 with a frame of the preceding thumbnail.

By dragging the first transition point 140 along row 105, the user can skim the video clips represented by the preceding and subsequent thumbnails. When skimming, the user swiftly glides through the frames of video clips to review the frames and display the frames in the user interface. Additional details about skimming features can be found in U.S. Utility application Ser. No. 11/771,761, Two Dimensional Timeline Display of Media Items, filed Apr. 6, 2004, the entire contents of which are herein incorporated by reference.

A second thumbnail 210 represents a second video clip including a second plurality of frames. The second plurality of frames can be distributed within the second thumbnail 210 between a left edge of the second thumbnail 220 and a right edge of the second thumbnail 230. In response to user input, starting with a second start frame positioned at the left edge 220 of the second thumbnail 210, the second plurality of frames can be played back in the user interface 100 until playback ends at a second end frame positioned at the right edge 230 of the second thumbnail 210. The second plurality of frames are played back in another row 205. Row 205 is vertically displaced from row 105 and in the implementation shown in FIG. 1, row 205 is positioned below row 105.

The second thumbnail 210 can have a second transition point 240. The second transition point 240 can be selectively positioned between the left edge 220 and the right edge 230 of the second thumbnail 210. The second transition point 240, in default implementations, is associated with the second start frame positioned at the left edge 220 of the second thumbnail 210. Playback of the second plurality of frames starts at the frame associated with the second transition point 240. Whereas the first plurality of frames located to the right of the first transition point 140 are not played back, the second plurality of frames located to the left of the second transition point 240 are not played back. For example, in some implementations, upon receiving playback input initiating playback in both row 105 and row 205, the playback progression continuously plays back the frames commencing at the first start frame positioned at the left edge 120 of the first thumbnail 110 to the frame associated with the first transition point 140 and then from the frame associated with the second transition point 240 to the second end frame positioned at the right edge 230 of the second thumbnail 210. In such an implementation, frames positioned to the right of the frame associated with the first transition point 140 in the first thumbnail 110 and frames positioned to the left of the frame associated with the second transition point 240 in the second thumbnail 210 are not played back in the user interface 100. Operations similar to the first video clip can also be performed on the second video clip.

The first transition point 140 and the second transition point 240 can be vertically aligned by positioning the frame associated with the second transition point 240 below the frame associated with the first transition point 140. In such an implementation, the first video clip is positioned in row 105 above the second video clip positioned in row 205. The first transition point 140 and second transition point 240 can be represented as a vertical bar 190, or transition marker, passing through the first thumbnail 110 and the second thumbnail 210. Even though the transition points 140, 240 are aligned by the vertical bar 190 in the implementation shown in FIG. 1, each transition point may be positioned independent of the other transition point. In other words, the positioning of the first transition point 140 within row 105 does not change the positioning of the second transition point 240 in row 205. Although each transition point can be positioned within its respective row independent of the positioning of the other transition point, in some implementations, the vertical bar 190 can tie the transition points together such that changing the positioning of the vertical bar 190 results in simultaneously changing the positioning of the transition points 140, 240.

As previously disclosed, the user may change the frame associated with the first transition point 140 by selecting a new frame in the first thumbnail 110. In some implementations, upon selecting the new frame, the first thumbnail 110 automatically shifts relative to the vertical bar 190 so as to align the new frame associated with the first transition point 140 with the vertical bar 190. As the first thumbnail 110 shifts relative to the vertical bar 190, the first plurality of frames distributed within the first thumbnail 110 shift relative to the vertical bar 190 as well. For example, in response to selecting the first transition point 140, the video editing software application automatically positions the frame associated with the first transition point 140 in alignment with the vertical bar 190.

In some implementations, the first transition point 140 is movable and can be associated with any frame in the first thumbnail 110, so long as the first transition point 140 is not positioned left of the left edge 220 of the second thumbnail 210. For example, the first transition point 140 cannot be associated with a frame of the first thumbnail 110 positioned further left than the left edge 220 of the second thumbnail 210 in row 205 because in response to the playback input, playback will not be able to play the portion of the first thumbnail 110 and the portion of the second thumbnail 210 continuously. In some implementations, the second transition point 140 is movable and can be associated with any frame in the second thumbnail 210, so long as the second transition point 240 is not positioned right of the right edge 130 of the first thumbnail 110. For example, the second transition point 240 cannot be associated with a frame of the second thumbnail 210 positioned further right that the right edge 130 of the first thumbnail 110 in row 105 because in response to the playback input, playback will not be able to play the portion of the first thumbnail 110 and the portion of the second thumbnail 210 continuously.

In some implementations, the video editing software application shifts the first thumbnail 110 relative to the vertical bar 190 by sliding the first thumbnail 110 within row 105 until the frame associated with the first transition point 140 is aligned with the vertical bar 190. In response to playback input, the first video clip, starting from the first start frame positioned at the left edge 110 of the first thumbnail 110 and ending at the frame aligned with the vertical bar 190, can be played back.

In some implementations, the first video clip and the second video clip can be selectively contiguous. This means that the first video clip can be a portion of a video file recorded at a point in time immediately preceding the second video clip. Conversely, the first video clip can be a portion of a video file recorded at a point in time subsequent the second video clip. Alternatively, the first video clip can be a portion of a video file recorded at a point in time unrelated to the recording of the second video clip.

In some implementations, the first thumbnail 110 and second thumbnail 210 can be rectangular. In some implementations, both the first and second thumbnails 110, 210 can contain information indicative of a duration of the video clip it represents. The duration of the video clip can be variable and in some implementations, the duration can be dependent upon user input. Altering the duration of the video clip can cause the representative thumbnail to be altered. The duration of the video editing project is defined by aggregating the information indicative of all the video clips included in playback. Additional details about the duration of video clips and the video editing project can be found in U.S. Utility application Ser. No. 11/771,761, Two Dimensional Timeline Display of Media Items, filed Apr. 6, 2004, the entire contents of which are herein incorporated by reference.

Figure 2:
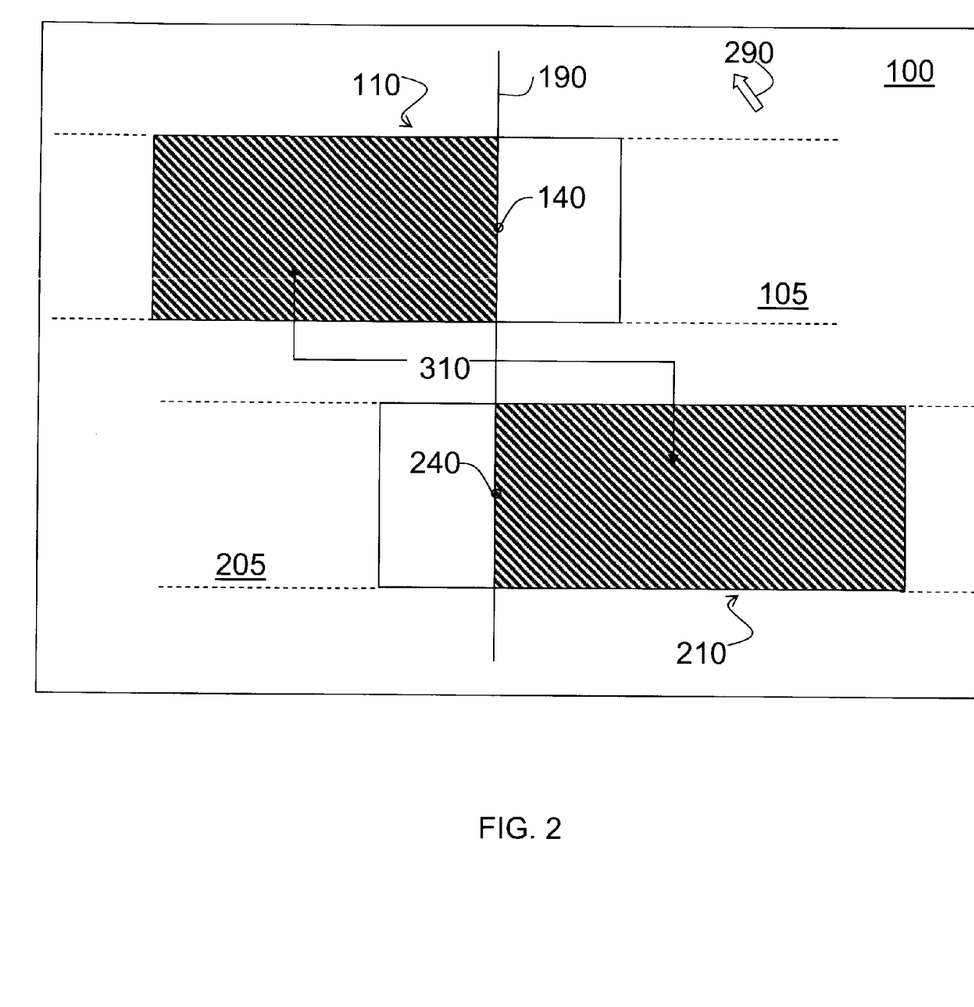

FIG. 2 shows an exemplary user interface 100 for editing video clips. In some implementations, upon receiving playback input, a portion of the first plurality of frames, from the first start frame positioned at the left edge 120 of the first thumbnail 110 to the frame associated with the first transition point 140, and a portion of the second plurality of frames, from the frame associated with the second transition point 240 to the second end frame positioned at the right edge 230 of the second thumbnail 210, are continuously played back. The first plurality of frames, from the first start frame positioned at the left edge 120 of the first thumbnail 110 to the frame associated with the first transition point 140, and the second plurality of frames, from the frame associated with the second transition point 240 to the second end frame positioned at the right edge 230 of the second thumbnail 210, comprise a third video clip 310. In the implementation shown in FIG. 2, the third video clip 310 is represented by a diagonal line pattern for the purpose of illustration only. The third video clip 310 can be stored in a storage device operatively coupled to a computer system on which the video editing software application is installed. Alternatively, the third video clip 310 can be sent to a remote location over one or more networks for operation including storing.

In some implementations, playback of the first, second or third video clips can depend upon the video editing software application detecting positioning of a cursor 290 in the user interface 100. Upon receiving playback input and upon the video editing software application detecting positioning of the cursor 290 outside rows 105 and 205, the third video clip 310 is played back. As shown in the implementation in FIG. 2, the cursor 290 is detected outside rows 105 and 205, therefore, upon receiving playback input, only the third video clip 310 is played back in the user interface 100.

In some implementations, upon receiving playback input and upon the video editing software application detecting positioning of the cursor 290 in row 105, playback includes video clips displayed in row 105. Thus, upon receiving playback input and upon the video editing software application detecting positioning of the cursor 290 in row 105, the first transition point 140 is ignored and playback includes all video clips of all thumbnails displayed in row 105. Similarly, upon receiving playback input and upon the video editing software application detecting positioning of the cursor 290 in row 205, playback includes video clips displayed in row 205. Thus, upon receiving playback input and upon the video editing software application detecting positioning of the cursor 290 in row 205, the second transition point 240 is ignored and playback includes all video clips of all thumbnails displayed in row 205.

In some implementations, a portion of the first plurality of frames, starting with the first start frame positioned at the left edge 120 of the first thumbnail 110 and ending at the frame associated with the first transition point 140, is emphasized. The portion of the first plurality of frames positioned to the right of the frame associated with the first transition point 140 is not emphasized. Similarly, a portion of the second plurality of frames, starting at the frame associated with the second transition point 240 and ending with the second end frame positioned at the right edge 230 of the second thumbnail 210, is emphasized. The portion of the second plurality of frames positioned to the left of the frame associated with the second transition point 240 is not emphasized.

In FIG. 2, the emphasized frames are depicted by a diagonal line pattern for the purpose of illustration only. The emphasized frames can be highlighted, colored, projected larger, outlined or showcased by other reasonable indicia. In FIG. 2, the non-emphasized frames are depicted without pattern for the purpose of illustration only. The non-emphasized frames can be grayed-out, lacking color, not shown, projected smaller or non-showcased by other reasonable indicia.

Figure 3:
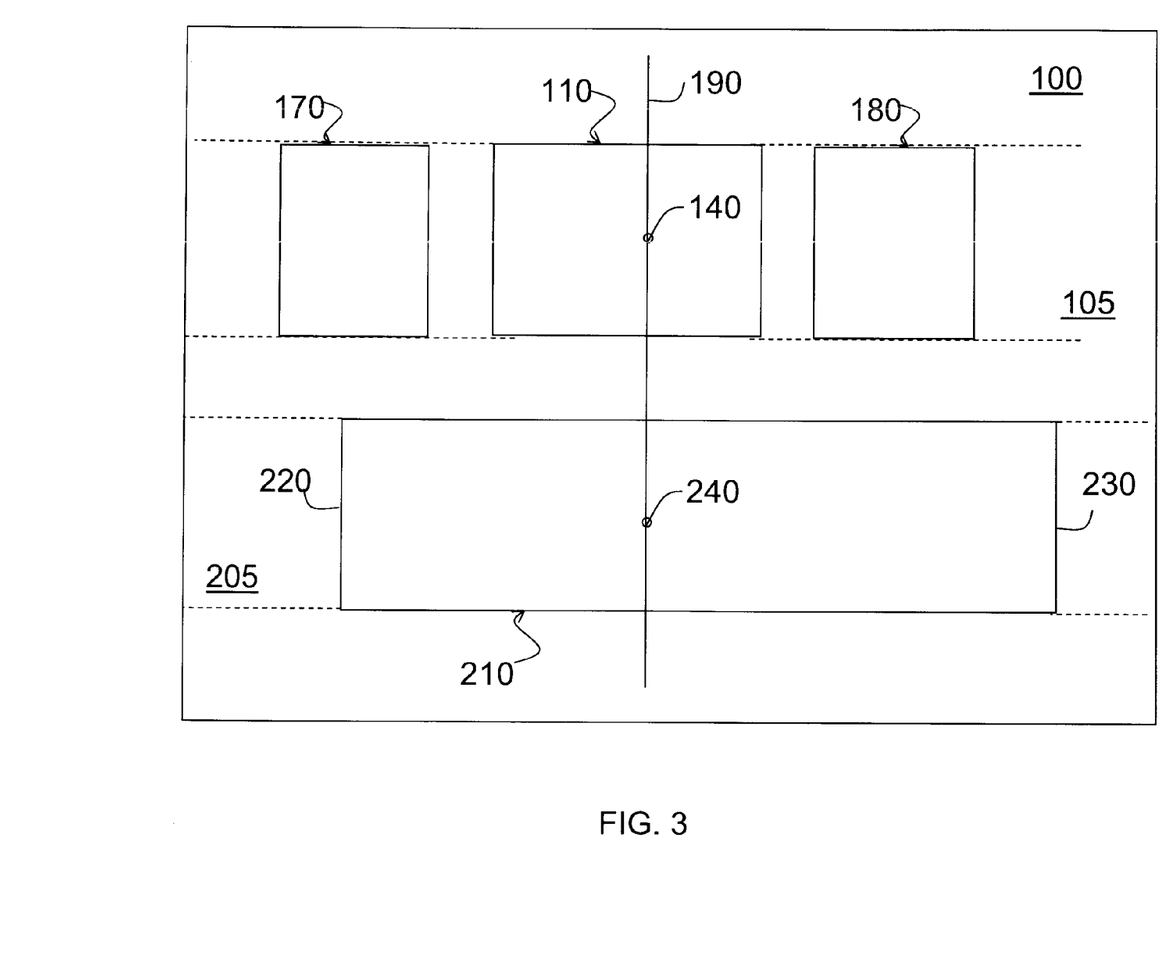

FIG. 3 shows an exemplary user interface 100 for editing video clips. In the implementation shown in FIG. 3, upon the video editing software application detecting positioning of the cursor 290 in row 105, a preceding thumbnail 170 representing a preceding video clip can be displayed to the left of the left edge 120 of the first thumbnail 110 and a subsequent thumbnail 180 representing a subsequent video clip can be displayed to the right of the right edge 130 of the first thumbnail 110. Although not shown in FIG. 3, the second thumbnail 210 can also have preceding and subsequent thumbnails representing preceding and subsequent video clips, adjacent its left edge 220 and right edge 230, respectively.

In some implementations, upon receiving playback input and upon the video editing software application detecting positioning of the cursor 290 in row 105, playback includes continuously playing back frames corresponding to: the preceding thumbnail 170 representing the preceding video clip, the first thumbnail 110 representing the first video clip, and the subsequent thumbnail 180 representing the subsequent video clip. In some implementations, the first video clip is the initial video clip in row 105 and as such, no preceding video clip is displayed in row 105. In some implementations, the first video clip is the last video clip in row 105 and as such, no subsequent video clip is displayed in row 105. Although not shown in FIG. 3, upon receiving playback input and upon the video editing software application detecting positioning of the cursor 290 in row 205, the second transition point 240 is ignored and playback includes continuously playing back the preceding, second and subsequent video clips in row 205.

In some implementations, the first video clip and all preceding video clips are displayed in row 105 of the user interface 100 regardless of whether or not the video editing software application detects positioning of the cursor 290 in row 105. In such an implementation, the frames of preceding video clips displayed to the left of the first transition point 140 are emphasized, whereas the frames of subsequent video clips displayed to the right of the first transition point 140 are not emphasized. In this implementation, the video editing software application displays emphasized video clips so that the user can visualize all video clips to be played in the user interface. In some implementations, the second video clip and all subsequent video clips are displayed in row 205 of user interface 100 regardless of whether or not the video editing software application detects positioning of the cursor 290 in row 205. In such an implementation, the frames of subsequent video clips displayed to the right of the second transition point 240 are emphasized, whereas the frames of preceding video clips displayed to the left of the second transition point 240 are not emphasized.

In some implementations, the user may select a new frame of the first video clip and may drag the new frame to the left of the user interface 100 in row 105. In some implementations, the new frame can be dragged outside the user interface 100. In some implementations, the new frame can be dragged towards the left boundary of the user interface 100. In response to the user dragging the new frame to the left, the video editing software application can automatically display additional thumbnails representing additional video clips subsequent to the subsequent thumbnail 180 representing the subsequent video clip in row 105. Thus, as the user drags the new frame to the left such that the preceding video clip will eventually fail to be displayed in user interface 100, the video editing software application simultaneously and automatically displays additional subsequent video clips while proportionately displacing the preceding thumbnail 170 representing the preceding video clip. In such an implementation, the video editing software application enables the user to view subsequent video clips that otherwise were not going to be played back in the video editing project. For example, as the user drags the selected new frame to the left, additional video clips subsequent to the subsequent video clip will be displayed, entering from the right of the user interface 100 in row 105, while a proportionate quantity of video clips, and their corresponding frames, preceding the selected new frame will no longer be displayed, leaving to the left of the user interface 100 in row 105. However, if the first video clip is the last video clip in row 105, when the user drags the new frame of the first video clip to the left, no additional subsequent video clips will be displayed. In response to the user dragging the new frame to the left, so long as there are additional frames to the right of the first transition point 140, the duration of the video editing project increases.

Similarly, in some implementations, the user may select a new frame of the first video clip and may drag the new frame to the right of the user interface 100 in row 105. In response to the user dragging the new frame to the right, the video editing software application can automatically display additional thumbnails representing additional video clips preceding the preceding thumbnail 170 representing the preceding video clip in row 105. Thus, as the user drags the new frame to the right such that the subsequent video clip will eventually fail to be displayed in the user interface 100, the video editing software application simultaneously and automatically displays additional preceding video clips while proportionately displacing the subsequent thumbnail 180 representing the subsequent video clip. For example, as the user drags the selected new frame to the right, additional video clips preceding the preceding video clip will be displayed, entering from the left of the user interface 100 in row 105, while a proportionate quantity of video clips, and their corresponding frames, subsequent to the selected new frame will no longer be displayed, leaving to the right of the user interface 100 in row 105. However, if the first video clip is the initial video clip in row 105, when the user drags the new frame of the first video clip to the right, no additional preceding video clips will be displayed. In response to the user dragging the new frame to the right, the duration of the video editing project decreases. Operations similar to the first video clip can be performed on the second video clip in row 205.

In some implementations, a video clip positioned in row 105 does not automatically move to row 205, and vice versa. The second video clip can move to row 105 from row 205 in the user interface 100 if the user selects an edit point subsequent to the second video clip in row 205. For example, if the user selects an edit point between two video clips subsequent to the second video clip (e.g., the second video clip precedes the edit point) in row 205, the edit point will shift relative to the vertical bar 190 such that the edit point will be aligned with the vertical bar 190 and video clips preceding the edit point will be displayed in row 105, thus the second video clip will be displayed in row 105. Similarly, the first video clip can move to row 205 from row 105 in the user interface 100 if the user selects an edit point preceding the first video clip in row

105. For example, if the user selects an edit point between two video clips preceding the first video clip (e.g., the first video clip is subsequent to the edit point) in row 105, the edit point will shift relative to the vertical bar 190 such that the edit point will be aligned with the vertical bar 190 and video clips subsequent the edit point will be displayed in row 205, thus the first video clip will be displayed in row 205.

In some implementations, like the one shown in FIG. 1, the vertical bar 190 can be moved to the left or the right of the user interface 100. By moving the vertical bar 190, the user may increase the quantity of the first video clip included in playback while simultaneously decreasing the playback of a proportionate quantity of the second video clip, or vice versa, such that the overall duration of the video editing project remains constant. For example, in response to the user moving the vertical bar 190 to the left, and upon the video editing software application detecting playback input, playback of the first video clip decreases whilst playback of the second video clip increases by a proportionate amount. Conversely, in response to the user moving the vertical bar 190 to the right, and upon the video editing software application detecting playback input, playback of the first video clip increases whilst playback of the second video clip decreases by a proportionate amount.

Figure 4:
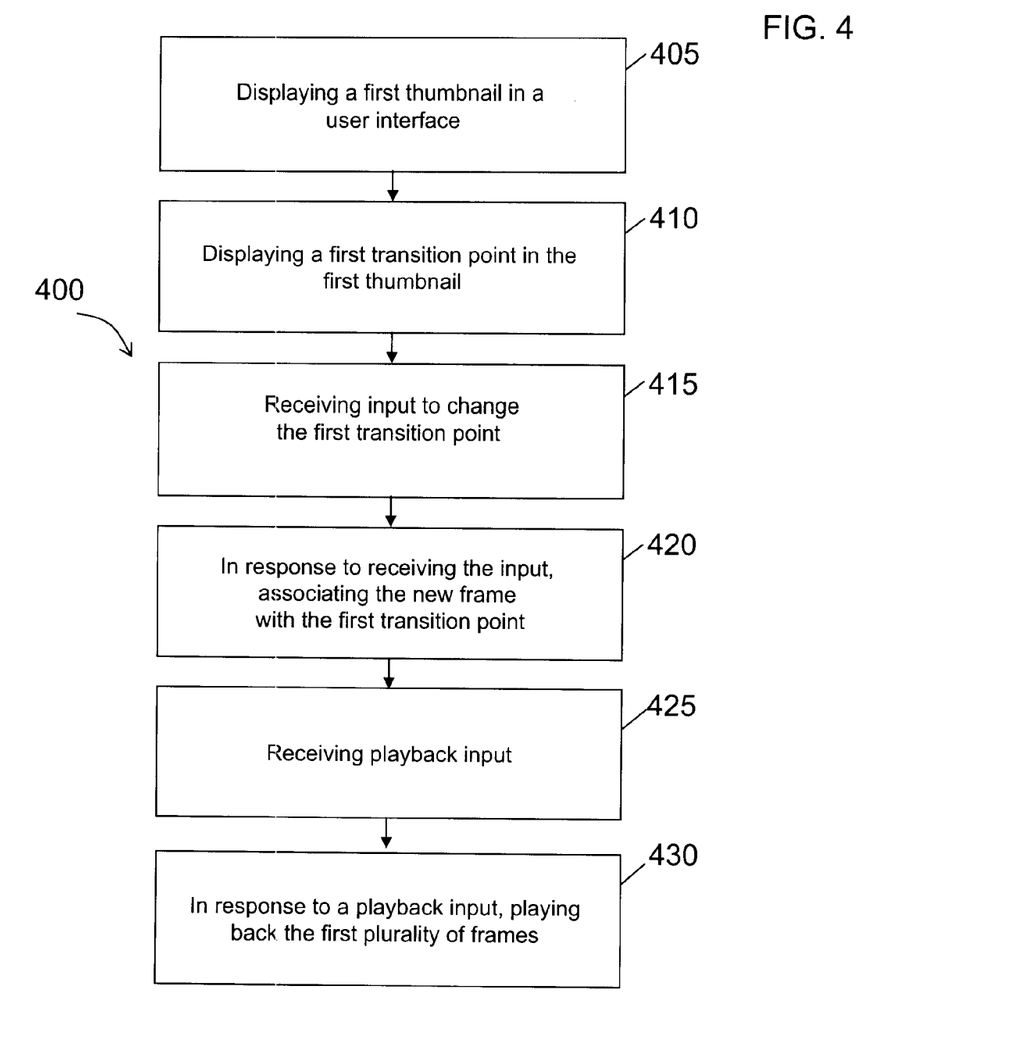
FIG. 4 shows a flowchart of an exemplary process for editing video clips.

FIG. 4 shows a flowchart of an exemplary process 400 for editing video clips. The process 400 can, for example, be implemented in the user interface 100 depicted in FIGS. 1-3.

In stage 405 a first thumbnail is displayed in a user interface. The first thumbnail represents a first video clip including a first plurality of frames. The user interface is provided by a video editing software application installed, e.g., on a computer system, where a user can view, edit, or otherwise process video clips by uploading the video clips in the user interface. The process 400 displays the video clips in the user interface, e.g., as one or more thumbnails.

In stage 410 a first transition point is displayed in the first thumbnail. The first transition point is associated with a frame of the first plurality of frames. The transition point, in default implementations, is associated with the first end frame positioned at the right edge of the first thumbnail by the video editing software application. In some implementations, the process 400 displays the transition point between the left edge and the right edge of the first thumbnail. The transition point can be associated with any frame of the first plurality of frames.

In stage 415 input is received to move the first transition point. The video editing software application moves the first transition point after receiving information from an input device. In some implementations, the video editing software application can change the frame associated with the first transition point to a new frame of the first plurality of frames based on user input. The user can employ any input device operatively coupled to the computer system on which the video editing software application is installed. For example, the user can employ a mouse in communication with the computer system to select the new frame by clicking on the new frame.

In response to receiving the input of stage 415, in stage 420 the first transition point is associated with the new frame. The new frame is detected by the video editing software application. Upon detection, the video editing software application moves the first transition point in the user interface to the new frame, whereby the first transition point is associated with the new frame.

In stage 425 playback input is received. The video editing software application receives playback input from the user. The user can employ any input device operatively coupled to the computer system on which the video editing software application is installed. For example, the user can employ a mouse in communication with the computer system to initiate playback by selecting a playback button in the user interface. Further, the user can employ a keyboard in communication with the computer system to initiate playback by selecting a playback button on the keyboard.

In response to receiving the playback input of stage 425, in stage 430 the first plurality of frames are played back. Playback occurs in the user interface. The video editing software application commences playback of the first plurality of frames starting with the first start frame positioned at the left edge of the first thumbnail and stopping at the new frame associated with the first transition point. The user can pause or stop playback by selecting pause or stop buttons with the mouse in the user interface. The user can also pause or stop playback by selecting pause or stop buttons on the keyboard.

Figure 5:
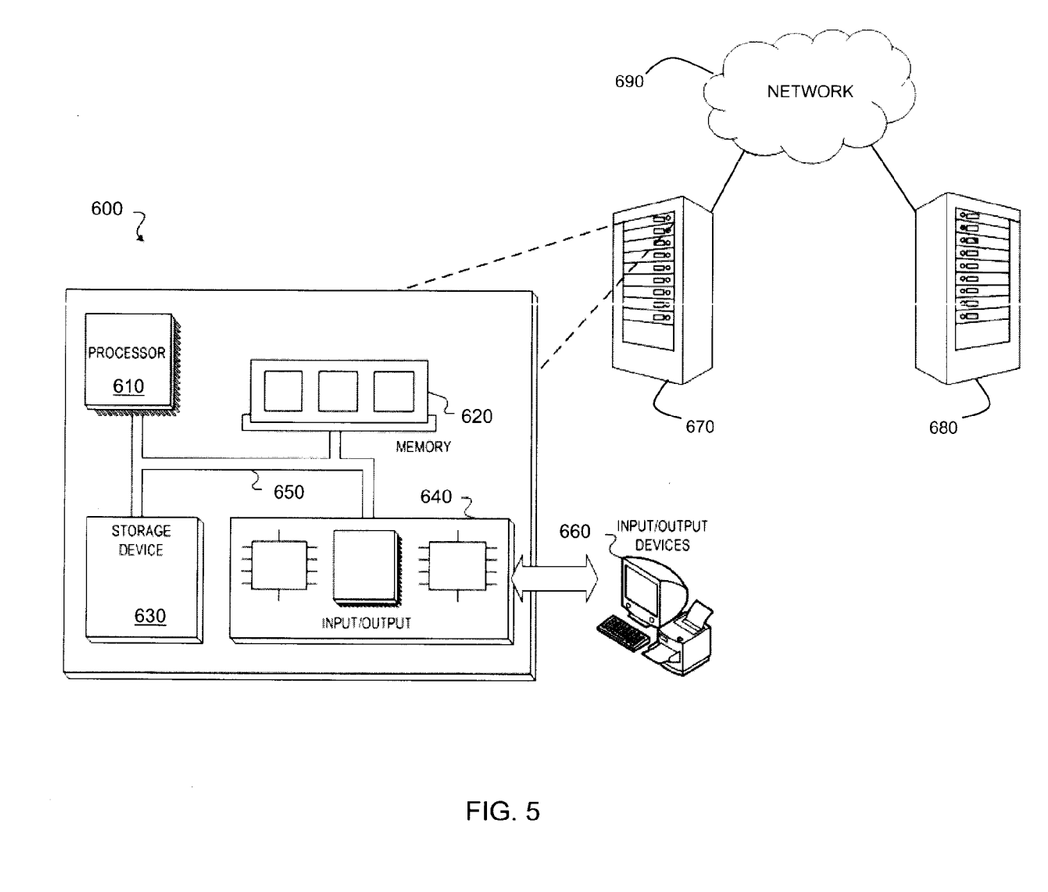
FIG. 5 is a schematic diagram of an example computer system that can be utilized to implement the systems and methods described herein.

FIG. 5 is a schematic diagram of an example computer system 600 that can be utilized to implement the systems and methods described herein. The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a computer-readable medium. In various implementations, the storage device 630 can, for example, include a hard disk device, an optical disk device, or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In some implementations, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The system 600 components 610, 620, 630, and 640 can be located in a local server 670. The local server 670 can be connected to a remote server 680 over a communication network 690. The communication network 690 can be implemented as a serial network, a local area network, a wireless network, a parallel network or other reasonable communication linking systems.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal. e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with any implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, one or more computers include a server operable to interact with a user interface device through a data communication network, and the user interface device is operable to interact with the server as a client. In some implementations, one or more computers include one personal computer and the personal computer includes the user interface device.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, the actions recited in the claims can be performed in a different order and still achieve desirable results.

In some implementations, the video editing software application can highlight video clips, and portions thereof, in the user interface selected by the user for playback. The highlighted video clips enable the user to determine the flow of playback from one video clip to the next. In some implementations, upon the video editing software application detecting positioning of the cursor within a row, all video clips displayed in the row can be highlighted. Upon the video editing software application highlighting all video clips displayed in the row, the user may skim all highlighted video clips.

In some implementations, in response to the user selecting either the first or second thumbnail or an indicator on the first or second thumbnails, the video editing software application displays a detailed view of the video clip represented by the respective thumbnail. The detailed view of the video clip can be displayed adjacent to other detailed views of video clips of the same stored video file. In some implementations, the user can increase the duration of the video clip displayed in the detailed view by selecting frames corresponding to adjacent video clips. In response to selecting frames corresponding to adjacent video clips, the video editing software application can add the selected frames to the video clip. In other implementations, the user can decrease the duration of the video clip displayed in the detailed view by selecting frames to eliminate from the video clip. In response to selecting frames to eliminate, the video editing software application can delete the selected frames from the video clip.

In some implementations, the video editing software application can distinguish one video clip from another video clip by displaying indicators between the video clips in a row of the user interface. In response to the user selecting an indicator within the row, the video editing software application shifts the indicator relative to the vertical bar, and in some implementations, aligns the indicator with the vertical bar.

In some implementations, the user can edit the video editing project using a fine tune trimming function provided by the video editing software application in the user interface. In some implementations, the video editing software application automatically removes any gaps in playback that developed due to eliminating frames from video clips in the user interface. For example, if a video clip is shortened for inclusion in the video editing project, all video clips displayed later in time can be shifted to occur earlier in time, right after the shortened video clip.

In some implementations, the vertical bar is fixed; the vertical bar can be positioned centrally in the user interface. In some implementations, in response to the user selecting the new frame associated with the first transition point, the video editing software application shifts the first thumbnail relative to the vertical bar to associate the new frame with the vertical bar. In some implementations, the vertical bar is movable; the user can select the vertical bar and in response, the video editing software application can move the vertical bar horizontally. In some implementations, in response to the user selecting the new frame associated with the first transition point, the video editing software application shifts the vertical bar relative to the thumbnail to associate the new frame with the vertical bar. In some implementations, upon shifting the vertical bar relative to the thumbnail, the video editing software application can re-shift the vertical bar to a centrally located position in the user interface.

In some implementations, multiple thumbnails representing video clips can be displayed in multiple rows in the user interface. The multiple rows can be vertically displaced. Each row displaying at least one video clip different than the other rows. At least one transition point can be displayed in each row. Transition points can be represented as vertical bars passing through at least two thumbnails. For example, the software application can display three thumbnails representing video clips in three rows. The third row positioned below the second row and the second row positioned below the first row. The first row can display a first thumbnail representing a first video clip, the second row can display a second thumbnail representing a second video clip, and the third row can display a third thumbnail representing a third video clip. A transition point can be associated with each thumbnail. The first and second transition points may be represented as a vertical bar, as can the second and third transition points. In such an implementation, the video editing software application can display two vertical bars passing through the second thumbnail in the user interface.

In some implementations, the first and second video segments can be displayed in a first and second bounded region, respectively. In some implementations, a first indicia representing a first transition point can be movable to any point in the first bounded region. The first transition point can correspond to a first time instant in the first video segment. In such an implementation, a portion of the first video segment is playable from the beginning of the first video segment to the first time instant. A second indicia representing a second transition point can be movable to any point in the second bounded region. The second transition point can correspond to a second time instant in the second video segment. In such an implementation, a portion of the second video segment is playable from the second time instant to the end of the second video segment. The portions of the first and second video segments can be played back in the user interface continuously.

In some implementations, the video editing software application can detect selection of a different time instant in the first video segment. In response to detecting the different time instant, the video editing software application can display the first indicia at the different time instant. In such an implementation, a portion of the first video segment from the beginning to the different time instant is playable. In some implementations, the video editing software application can play back the portion of the first video segment from the beginning of the first video segment to the different time instant and the portion of the second video segment from the second time instant to the end of the second video segment continuously.

In some implementations, the video editing software application can display a plurality of bounded regions each displaying respective video segments in a user interface display region. In such an implementation, at least a first bounded region displaying a first video segment and a second bounded region displaying a second video segment can be displayed in the user interface display region. In some implementations, a transition marker intersecting the first and second bounded regions and defining a first transition point in the first video segment and a second transition point in the second video segment can be displayed. In such an implementation, the first transition point corresponds to a first intersection of the transition marker and the first bounded region, whereas the second transition point corresponds to a second intersection of the transition marker and the second bounded region. In some implementations, in response to user input, the video editing software application can alter one or both of the first and second transition points by visually effecting relative movement between one or more of the first video segment, the second video segment and the transition marker. In some implementations, the video editing software application can display an edited video segment including a portion of the first video segment ending at the first transition point followed by a portion of the second video segment beginning at the second transition point.

What is claimed is:

1. A computer-implemented method comprising:
displaying a first video segment in a first bounded region in a first row and a second video segment in a second bounded region in a second row, where the second bounded region in the second row is vertically displaced from the first bounded region in the first row;
displaying a first indicia in the first bounded region, wherein the first indicia is movable to any point in the first bounded region, the first indicia representing a first transition point that corresponds to a first time instant in the first video segment such that a portion from a beginning of the first video segment to the first time instant is playable;
displaying a second indicia in the second bounded region, the second indicia vertically aligned with the first indicia, wherein the second indicia is movable to any point in the second bounded region, the second indicia representing a second transition point that corresponds to a second time instant in the second video segment such that a portion from the second time instant to an end of the second video segment is playable;
receiving a playback input; and
in response to receiving the playback input, playing back the portion from the beginning of the first video segment to the first time instant and the portion from the second time instant to the end of the second video segment continuously.

2. The method of claim 1, further comprising detecting selection of a different time instant in the first video segment and in response to the detecting displaying the first indicia at the different time instant.

3. The method of claim 2, wherein the portion from the beginning of the first video segment to the different time instant is playable.

4. The method of claim 3, further comprising receiving a new playback input and in response to receiving the new playback input, playing back the portion from the beginning of the first video segment to the different time instant and the portion from the second time instant to the end of the second video segment continuously.

5. A computer-implemented method comprising:
displaying in a user interface, in a first row, a first thumbnail representing a first video clip including a first plurality of frames, the first thumbnail including a left edge and a right edge, the first plurality of frames distributed between the left edge and the right edge of the first thumbnail, wherein the first plurality of frames are playable starting with a first start frame positioned at the left edge of the first thumbnail and ending with a first end frame positioned at the right edge of the first thumbnail;
displaying in the first thumbnail, a first transition point positioned between the left edge and the right edge of the first thumbnail, the first transition point associated with a frame of the first plurality of frames, wherein, in response to a playback input, playback of the first plurality of frames starts with the first start frame positioned at the left edge and stops at the frame associated with the first transition point;
receiving a first move input to move the frame associated with the first transition point to a new frame of the first plurality of frames;
in response to receiving the first move input, associating the new frame with the first transition point, wherein, in response to the playback input, playback of the first plurality of frames starts with the first start frame positioned at the left edge of the first thumbnail and stops at the new frame;
displaying in the user interface, in another row vertically displaced from the first row, a second thumbnail representing a second video clip including a second plurality of frames, the second thumbnail including a left edge and a right edge, the second plurality of frames distributed between the left edge and the right edge of the second thumbnail, wherein the second plurality of frames are playable starting with a second start frame positioned at the left edge of the second thumbnail and ending with a second end frame positioned at the right edge of the second thumbnail;
displaying in the second thumbnail, a second transition point positioned between the left edge and the right edge of the second thumbnail, the second transition point associated with a frame of the second plurality of frames, wherein, in response to the playback input, playback of the second plurality of frames starts at the frame associated with the second transition point and stops at the second end frame positioned at the right edge of the second thumbnail;
receiving a second move input to move the frame associated with the second transition point to a new frame of the second plurality of frames; and
in response to receiving the second move input, associating the new frame with the second transition point, wherein, in response to the playback input, playback of the second plurality of frames starts with the new frame and stops at the second end frame positioned at the right edge of the second thumbnail.

6. The method of claim 5, further comprising aligning the first transition point with the second transition point in the user interface.

7. The method of claim 6, wherein aligning the first transition point with the second transition point comprises positioning the frame associated with the second transition point below the first transition point.

8. The method of claim 5, further comprising representing the first transition point and the second transition point by a vertical bar in the user interface passing through the first thumbnail and the second thumbnail.

9. The method of claim 5, further comprising upon detecting positioning of a cursor on the first thumbnail or in the first row, playing back includes the first plurality of frames.

10. The method of claim 5, further comprising upon detecting positioning of the cursor on the second thumbnail or in the another row, playing back includes the second plurality of frames.

11. The method of claim 5, further comprising, in response to receiving the playback input, continuously playing back the frames from the first start frame positioned at the left edge of the first thumbnail to the frame associated with the first transition point and then from the frame associated with the second transition point to the second end frame positioned at the right edge of the second thumbnail.

12. The method of claim 5, wherein the first video clip and the second video clip are selectively contiguous.

13. The method of claim 5 wherein the first plurality of frames distributed between the left edge and the first transition point of the first thumbnail and the second plurality of frames distributed between the second transition point and the right edge of the second thumbnail comprise a third video clip.

14. The method of claim 13, further comprising upon detecting positioning of the cursor outside the first row and the another row, playing back includes the third video clip.

15. The method of claim 13, further comprising saving the third video clip.

16. The method of claim 5, further comprising:
displaying a preceding thumbnail representing a preceding video clip to the left of the left edge of the first thumbnail and a subsequent thumbnail representing a subsequent video clip to the right of the right edge of the first thumbnail upon detecting positioning of the cursor within the first row.

17. The method of claim 16, further comprising selecting the new frame and dragging the new frame to the left of the user interface, wherein, in response to dragging, additional thumbnails representing additional video clips subsequent to the subsequent video clip are displayed.

18. The method of claim 8, wherein upon receiving the first move input to move the frame associated with the first transition point to the new frame, the first thumbnail shifts relative to the vertical bar.

19. The method of claim 5, wherein the first plurality of frames starting with the first start frame positioned at the left edge of the first thumbnail and ending at the frame associated with the first transition point are emphasized.

20. The method of claim 5, wherein the second plurality of frames starting at the frame associated with the second transition point and ending with the second end frame positioned at the right edge of the second thumbnail are emphasized.

21. The method of claim 5, wherein the first thumbnail is rectangular.

22. A computer-implemented method comprising:
displaying in a user interface display region a plurality of bounded regions each displaying respective video segments including at least a first bounded region in a first row, the first bounded region displaying a first video segment, and a second bounded region in a second row vertically displaced from the first bounded region in the first row, the second bounded region displaying a second video segment;
displaying in the user interface display region a vertical transition marker that intersects the first and second bounded regions, the transition marker defining a first transition point in the first video segment and a second transition point in the second video segment, the first transition point corresponding to a first intersection of the transition marker and the first bounded region and the second transition point corresponding to a second intersection of the transition marker and the second bounded region; and
receiving user input to alter one or both of the first and second transition points by visually effecting relative movement between one or more of the first video segment, the second video segment and the transition marker.

23. The method of claim 22, further comprising displaying an edited video segment comprising a portion of the first video segment ending at the first transition point followed by a portion of the second video segment beginning at the second transition point.

24. A computer program product, encoded on a computer-readable medium, operable to cause data processing apparatus to perform operations comprising:
presenting a first video segment in a first bounded region in a first row and a second video segment in a second bounded region in a second row, where the second bounded region in the second row is vertically displaced from the first bounded region in the first row;
presenting a first indicia in the first bounded region, wherein the first indicia is movable to any point in the first bounded region, the first indicia representing a first transition point that corresponds to a first time instant in the first video segment such that a portion from a beginning of the first video segment to the first time instant is playable;
presenting a second indicia in the second bounded region, the second indicia vertically_aligned with the first indicia, wherein the second indicia is movable to any point in the second bounded region, the second indicia representing a second transition point that corresponds to a second time instant in the second video segment such that a portion from the second time instant to an end of the second video segment is playable;
accepting a playback input; and
in response to accepting the playback input, playing back the portion from the beginning of the first video segment to the first time instant and the portion from the second time instant to the end of the second video segment continuously.

25. The computer program product of claim 24, further comprising detecting selection of a different time instant in the first video segment and in response to the detecting presenting the first indicia at the different time instant.

26. The computer program product of claim 25, wherein the portion from the beginning of the first video segment to the different time instant is playable.

27. The computer program product of claim 26, further comprising accepting a new playback input and in response to accepting the new playback input, playing back the portion from the beginning of the first video segment to the different time instant and the portion from the second time instant to the end of the second video segment continuously.

28. A computer program product, encoded on a computer-readable medium, operable to cause data processing apparatus to perform operations comprising:
presenting in a user interface, in a first row, a first thumbnail representing a first video clip including a first plurality of frames, the first thumbnail including a left edge and a right edge, the first plurality of frames distributed between the left edge and the right edge of the first thumbnail, wherein the first plurality of frames are playable starting with a first start frame positioned at the left edge of the first thumbnail and ending with a first end frame positioned at the right edge of the first thumbnail;
presenting in the first thumbnail, a first transition point positioned between the left edge and the right edge of the first thumbnail, the first transition point associated with a frame of the first plurality of frames, wherein, in response to a playback input, playback of the first plurality of frames starts with the first start frame positioned at the left edge and stops at the frame associated with the first transition point;

accepting a first move input to move the frame associated with the first transition point to a new frame of the first plurality of frames;

in response to accepting the first move input, associating the new frame with the first transition point, wherein, in response to the playback input, playback of the first plurality of frames starts with the first start frame positioned at the left edge of the first thumbnail and stops at the new frame;

presenting in the user interface, in another row vertically displaced from the first row, a second thumbnail representing a second video clip including a second plurality of frames, the second thumbnail including a left edge and a right edge, the second plurality of frames distributed between the left edge and the right edge of the second thumbnail, wherein the second plurality of frames are playable starting with a second start frame positioned at the left edge of the second thumbnail and ending with a second end frame positioned at the right edge of the second thumbnail;

presenting in the second thumbnail, a second transition point positioned between the left edge and the right edge of the second thumbnail, the second transition point associated with a frame of the second plurality of frames, wherein, in response to the playback input, playback of the second plurality of frames starts at the frame associated with the second transition point and stops at the second end frame positioned at the right edge of the second thumbnail;

accepting a second move input to move the frame associated with the second transition point to a new frame of the second plurality of frames; and in response to accepting the second move input, associating the new frame with the second transition point, wherein, in response to the playback input, playback of the second plurality of frames starts with the new frame and stops at the second end frame positioned at the right edge of the second thumbnail.

29. The computer program product of claim 28, further comprising aligning the first transition point with the second transition point in the user interface.

30. The computer program product of claim 29, wherein aligning the first transition point with the second transition point comprises positioning the frame associated with the second transition point below the first transition point.

31. The computer program product of claim 28, further comprising representing the first transition point and the second transition point by a vertical bar in the user interface passing through the first thumbnail and the second thumbnail.

32. The computer program product of claim 28, further comprising upon detecting positioning of a cursor on the first thumbnail or in the first row, playing back includes the first plurality of frames.

33. The computer program product of claim 28, further comprising upon detecting positioning of the cursor on the second thumbnail or in the another row, playing back includes the second plurality of frames.

34. The computer program product of claim 28, further comprising, in response to accepting the playback input, continuously playing back the frames from the first start frame positioned at the left edge of the first thumbnail to the frame associated with the first transition point and then from the frame associated with the second transition point to the second end frame positioned at the right edge of the second thumbnail.

35. The computer program product of claim 28, wherein the first video clip and the second video clip are selectively contiguous.

36. The computer program product of claim 28, wherein the first plurality of frames distributed between the left edge and the first transition point of the first thumbnail and the second plurality of frames distributed between the second transition point and the right edge of the second thumbnail comprise a third video clip.

37. The computer program product of claim 36, further comprising upon detecting positioning of the cursor outside the first row and the another row, playing back includes the third video clip.

38. The computer program product of claim 36, further comprising saving the third video clip.

39. The computer program product of claim 28, further comprising presenting a preceding thumbnail representing a preceding video clip to the left of the left edge of the first thumbnail and a subsequent thumbnail representing a subsequent video clip to the right of the right edge of the first thumbnail upon detecting positioning of the cursor within the first row.

40. The computer program product of claim 39, further comprising selecting the new frame and dragging the new frame to the left of the user interface, wherein, in response to dragging, additional thumbnails representing additional video clips subsequent to the subsequent video clip are presented.

41. The computer program product of claim 31, wherein upon accepting the first move input to move the frame associated with the first transition point to the new frame the first thumbnail shifts relative to the vertical bar.

42. The computer program product of claim 28, wherein the first plurality of frames starting with the first start frame positioned at the left edge of the first thumbnail and ending at the frame associated with the first transition point are emphasized.

43. The computer program product of claim 28, wherein the second plurality of frames starting at the frame associated with the second transition point and ending with the second end frame positioned at the right edge of the second thumbnail are emphasized.

44. The computer program product of claim 28, wherein the first thumbnail is rectangular.

45. A computer program product, encoded on a computer-readable medium, operable to cause data processing apparatus to perform operations comprising:

presenting in a user interface display region a plurality of bounded regions each displaying respective video segments including at least a first bounded region in a first row, the first bounded region displaying a first video segment, and a second bounded region in a second row vertically displaced from the first bounded region in the first row, the second bounded region displaying a second video segment;

presenting in the user interface display region a vertical transition marker that intersects the first and second bounded regions, the transition marker defining a first transition point in the first video segment and a second transition point in the second video segment, the first transition point corresponding to a first intersection of the transition marker and the first bounded region and the second transition point corresponding to a second intersection of the transition marker and the second bounded region; and accepting user input to alter one or both of the first and second transition points by visually effecting relative movement between one or more of the first video segment, the second video segment and the transition marker.

46. The computer program product of claim 45, further comprising presenting an edited video segment comprising a portion of the first video segment ending at the first transition point followed by a portion of the second video segment beginning at the second transition point.

47. A system comprising:
a user interface device; and
one or more computers operable to interact with the user interface device comprising:
a display device, the display device to:
display a first video segment in a first bounded region in a first row and a second video segment in a second bounded region in a second row, where the second bounded region in the second row is vertically displaced from the first bounded region in the first row;
display a first indicia in the first bounded region, wherein the first indicia is movable to any point in the first bounded region, the first indicia representing a first transition point that corresponds to a first time instant in the first video segment such that a portion from a beginning of the first video segment to the first time instant is playable;
display a second indicia in the second bounded region, the second indicia vertically aligned with the first indicia, wherein the second indicia is movable to any point in the second bounded region, the second indicia representing a second transition point that corresponds to a second time instant in the second video segment such that a portion from the second time instant to an end of the second video segment is playable; and
an input device, the input device to receive a playback input and in response to receiving the playback input, playing back the portion from the beginning of the first video segment to the first time instant and the portion from the second time instant to the end of the second video segment continuously.

48. The system of claim 47, further comprising a detection device, the detection device to detect selection of a different time instant in the first video segment and in response to the detecting displaying the first indicia at the different time instant.

49. The system of claim 48, wherein the portion from the beginning of the first video segment to the different time instant is playable.

50. The system of claim 49, further comprising receiving a new playback input and in response to receiving the new playback input, playing back the portion from the beginning of the first video segment to the different time instant and the portion from the second time instant to the end of the second video segment continuously.

51. A system comprising:
a user interface device; and
one or more computers operable to interact with the user interface device comprising:
a display device, the display device to:
display in the user interface device, in a first row, a first thumbnail representing a first video clip including a first plurality of frames, the first thumbnail including a left edge and a right edge, the first plurality of frames distributed between the left edge and the right edge of the first thumbnail, wherein the first plurality of frames are playable starting with a first start frame positioned at the left edge of the first thumbnail and ending with a first end frame positioned at the right edge of the first thumbnail;
display in the first thumbnail, a first transition point positioned between the left edge and the right edge of the first thumbnail, the first transition point associated with a frame of the first plurality of frames, wherein, in response to a playback input, playback of the first plurality of frames starts with the first start frame positioned at the left edge and stops at the frame associated with the first transition point;
display in another row vertically displaced from the first row, a second thumbnail representing a second video clip including a second plurality of frames, the second thumbnail including a left edge and a right edge, the second plurality of frames distributed between the left edge and the right edge of the second thumbnail, wherein the second plurality of frames are playable starting with a second start frame positioned at the left edge of the second thumbnail and ending with a second end frame positioned at the right edge of the second thumbnail; and
display in the second thumbnail, a second transition point positioned between the left edge and the right edge of the second thumbnail, the second transition point associated with a frame of the second plurality of frames, wherein, in response to the playback input, playback of the second plurality of frames starts at the frame associated with the second transition point and stops at the second end frame positioned at the right edge of the second thumbnail; and
an input device, the input device to receive:
a first move input to move the frame associated with the first transition point to a new frame of the first plurality of frames and in response to receiving the first move input, associating the new frame with the first transition point, wherein, in response to the playback input, playback of the first plurality of frames starts with the first start frame positioned at the left edge of the first thumbnail and stops at the new frame; and
a second move input to move the frame associated with the second transition point to a new frame of the second plurality of frames and in response to receiving the second move input, associating the new frame with the second transition point, wherein, in response to the playback input, playback of the second plurality of frames starts with the new frame and stops at the second end frame positioned at the right edge of the second thumbnail.

52. The system of claim 51, further comprising circuitry to align the first transition point with the second transition point in the user interface device.

53. The system of claim 52, wherein aligning the first transition point with the second transition point comprises positioning the frame associated with the second transition point below the first transition point.

54. The system of claim 51, further comprising circuitry to represent the first transition point and the second transition point by a vertical bar in the user interface device passing through the first thumbnail and the second thumbnail.

55. The system of claim 51, further comprising circuitry to detect positioning of a cursor, wherein upon detecting positioning of the cursor on the first thumbnail or in the first row, playing back includes the first plurality of frames.

56. The system of claim 51, further comprising upon detecting positioning of the cursor on the second thumbnail or in the another row, playing back includes the second plurality of frames.

57. The system of claim 51, further comprising circuitry, in response to receiving playback input, to continuously play back the frames from the first start frame positioned at the left edge of the first thumbnail to the frame associated with the first transition point and then from the frame associated with the second transition point to the second end frame positioned at the right edge of the second thumbnail.

58. The system of claim 51, wherein the first video clip and the second video clip are selectively contiguous.

59. The system of claim 51, wherein the first plurality of frames distributed between the left edge and the first transition point of the first thumbnail and the second plurality of frames distributed between the second transition point and the right edge of the second thumbnail comprise a third video clip.

60. The system of claim 59, further comprising upon detecting positioning of the cursor outside the first row and the another row, playing back includes the third video clip.

61. The system of claim 59, further comprising circuitry to save the third video clip.

62. The system of claim 51, wherein the display device displays a preceding thumbnail representing a preceding video clip to the left of the left edge of the first thumbnail and a subsequent thumbnail representing a subsequent video clip to the right of the right edge of the first thumbnail upon detecting positioning of the cursor within the first row.

63. The system of claim 62, further comprising circuitry to select the new frame and drag the new frame to the left of the user interface device, wherein, in response to dragging, additional thumbnails representing additional video clips subsequent to the subsequent video clip are displayed.

64. The system of claim 54, wherein upon receiving input to change the frame associated with the first transition point to the new frame the first thumbnail shifts relative to the vertical bar.

65. The system of claim 51, wherein the first plurality of frames starting with the first start frame positioned at the left edge of the first thumbnail and ending at the frame associated with the first transition point are emphasized.

66. The system of claim 51, wherein the second plurality of frames starting with the frame associated with the second transition point and ending with the second end frame positioned at the right edge of the second thumbnail are emphasized.

67. The system of claim 51, where the first thumbnail is rectangular.

68. A system comprising:
a user interface device; and
one or more computers operable to interact with the user interface device comprising:
a display device, the display device to:
display in a user interface display region a plurality of bounded regions each displaying respective video segments including at least a first bounded region in a first row, the first bounded region displaying a first video segment, and a second bounded region in a second row vertically displaced from the first bounded region in the first row, the second bounded region displaying a second video segment;
display in the user interface display region a vertical transition marker that intersects the first and second bounded regions, the transition marker defining a first transition point in the first video segment and a second transition point in the second video segment, the first transition point corresponding to a first intersection of the transition marker and the first bounded region and the second transition point corresponding to a second intersection of the transition marker and the second bounded region; and
an input device, the input device to receive user input to alter one or both of the first and second transition points by visually effecting relative movement between one or more of the first video segment, the second video segment and the transition marker.

69. The system of claim 68, wherein the display device displays an edited video segment comprising a portion of the first video segment ending at the first transition point followed by a portion of the second video segment beginning at the second transition point.

* * * * *